United States Patent [19]

Mehrgardt

[11] Patent Number: 4,736,334

[45] Date of Patent: Apr. 5, 1988

[54] CIRCUIT FOR CALCULATING THE VALUE OF A COMPLEX DIGITAL VARIABLE

[75] Inventor: Soenke Mehrgardt, March-Neuershausen, Fed. Rep. of Germany

[73] Assignee: Deutsche ITT Industries GmbH, Freiburg, Fed. Rep. of Germany

[21] Appl. No.: 791,700

[22] Filed: Oct. 28, 1985

[30] Foreign Application Priority Data

Nov. 2, 1984 [EP] European Pat. Off. ........ 84 113204.6

[51] Int. Cl.⁴ ............................................. G06F 7/552
[52] U.S. Cl. .................................................... 364/752
[58] Field of Search ............... 364/752, 721, 729, 768, 364/814

[56] References Cited

U.S. PATENT DOCUMENTS

| | | | |
|---|---|---|---|
| 3,829,671 | 8/1974 | Gathright et al. | 364/752 |
| 3,858,036 | 12/1974 | Lunsford | 364/752 |
| 4,503,549 | 3/1985 | Slabinski | 364/752 X |
| 4,553,260 | 11/1985 | Belt et al. | 364/752 X |
| 4,599,701 | 7/1986 | Vojir et al. | 364/752 |

OTHER PUBLICATIONS

Moler et al., "*Replacing Square Roots by Pythagorean Sums*", IBM Technical Disclosure Bulletin, vol. 27, No. 6, Nov. 1983, pp. 577–581.

Primary Examiner—Gary V. Harkcom
Assistant Examiner—Tan V. Mai
Attorney, Agent, or Firm—T. L. Peterson

[57] ABSTRACT

The circuit arrangement includes a basic circuit for calculating the zeroth approximation and expandable by at least one correction circuit for calculating a first or further approximations. The basic circuit contains a first adder, a second adder, a first constant multiplier, a second constant multiplier, a first absolute-value stage, a second absolute-value stage and a third absolute-value stage which is interposed between a subtracter and the input of the second constant multiplier. The output of the second constant multiplier is coupled to one input of the second adder, whose output provides the zeroth approximation to the value of the complex digital quantity. Each of the two input signals is fed through one of the absolute-value stages to one of the two inputs of the subtracter and the first adder.

4 Claims, 2 Drawing Sheets

CIRCUIT FOR CALCULATING THE VALUE OF A COMPLEX DIGITAL VARIABLE

BACKGROUND OF THE INVENTION

The invention relates to a circuit for calculating the value of a complex digital quantity.

In particular, the present invention relates to a circuit arrangement with digital circuits for calculating the value of a complex digital quantity $x+iy$ of two digital values x and y as an approximation by means of a basic circuit.

In some digital-transmission systems using amplitude modulation, it is necessary in connection with the demodulation of quadrature signals to calculate the amplitude (value)

$$B=\sqrt{x^2+y^2},$$

i.e., the value of the complex digital quantity $x+iy$.

Demodulation of quadature signals is necessary, for example, in AM stereo systems and in the arrangement disclosed in German OS No. 31 14 063.

The value B could be calculated electronically by squaring x and y and then extracting the root by known methods, e.g., with the aid of a table and/or by polynomial approximation. Another method would be to use logarithm tables.

SUMMARY OF THE INVENTION

One object of the invention is to provide a digital circuit arrangement which can be implemented in the form of an integrated circuit on a small chip area, and which can be improved so as to be suitable for video applications.

The circuit arrangement includes a basic circuit for calculating the zeroth approximation and expandable by at least one correction circuit for calculating a first or further approximations. The basic circuit contains a first adder, a second adder, a first constant multiplier, a second constant multiplier, a first absolute-value stage, a second absolute-value stage and a third absolute-value stage which is interposed between a subtracter and the input of the second constant multiplier. The output of the second constant multiplier is coupled to one input of the second adder, whose output provides the zeroth approximation to the value of the complex digital quantity. Each of the two input signals is fed through one of the absolute-value stages to one of the two inputs of the subtracter and the first adder.

BRIEF DESCRIPTION OF THE DRAWING

The invention will be better understood from a reading of the following detailed description in conjunction with the drawing in which.

DETAILED DESCRIPTION

Figure 1:
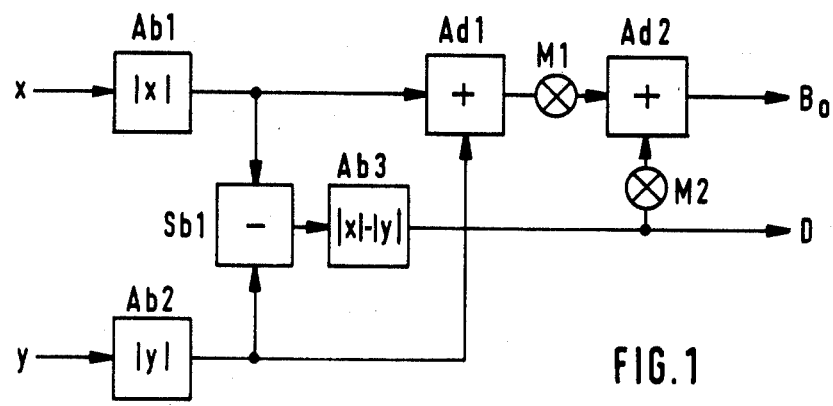
FIG. 1 is a block diagram of the basic circuit.

FIG. 1 shows the basic circuit, which generates the zeroth approximation Bo of the value B according to the equation $$Bo = m1 \cdot (x+y) + m2 \cdot D$$

where $$D = ||x| - |y||.$$

This basic circuit contains the absolute value circuits Ab1, Ab2, and Ab3, i.e., digital circuits which invert negative digital quantities. The basic circuit of FIG. 1 further includes the two adders Ad1 and Ad2 of conventional design and the digital subtracter Sb1 of conventional design. M1 and M2 are constant multipliers, i.e., multipliers of conventional design, one input of each of which is supplied with a fixed multiplication factor from, e.g., a read-only memory.

The first digital value x is fed through the first absolute-value circuit Ab1 to the first input of the first adder Ad1 and to the first input of the subtracter Sb1. The second input of the subtracter Sb1 is connected to the second input of the first adder Ad1 and to the output of the second absolute-value circuit Ab2, whose input is presented with the second digital value y.

The output of the first adder Ad1 is coupled through the first constant multiplier M1 to the first input of the second adder Ad2, which has its second input connected to the output of the second constant multiplier M2, while the input of the latter is connected to the output of a third absolute-value circuit Ab3, which forms the absolute value of the output of the subtracter Sb1.

Figure 3:
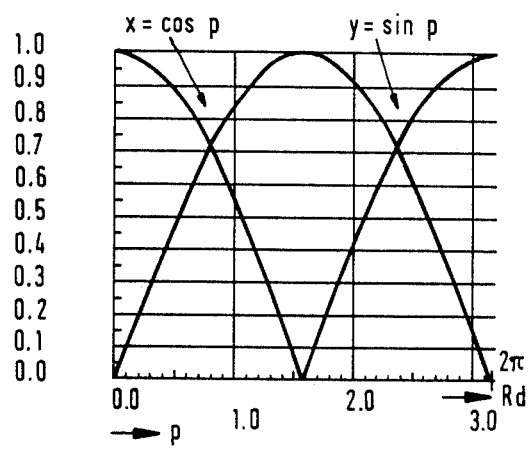
FIG. 3 is a graph of $x=\cos p$ that is applied to one input of the present invention, and $y=\sin p$ that is applied to the other input of the present invention.
Figure 4:
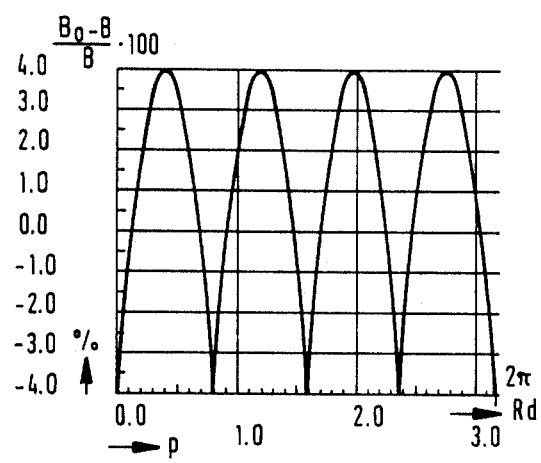
FIG. 4 illustrates the relative error of a zeroth approximation B0 to the signal B applied to the two inputs.

If suitable values are chosen for the multiplication factors of M1 and M2, the output of the second adder Ad2 provides the zeroth approximation Bo. If multiplication factor $m1=0.6791$ for the first constant multiplier M1, and a multiplication factor $m2=0.2614$ for the second constant multiplier M2, the error of the approximation Bo is less than 4% of the value of the input signal $E=\cos p + i \sin p$ $(p=0,\ldots,2\pi)$. FIG. 3 shows such an input signal, while FIG. 4 shows the relative error of Bo/B in percent, which reaches a maximum value of 4%. Such an approximation to the value of the complex input signal is sufficient for some applications.

Figure 2:
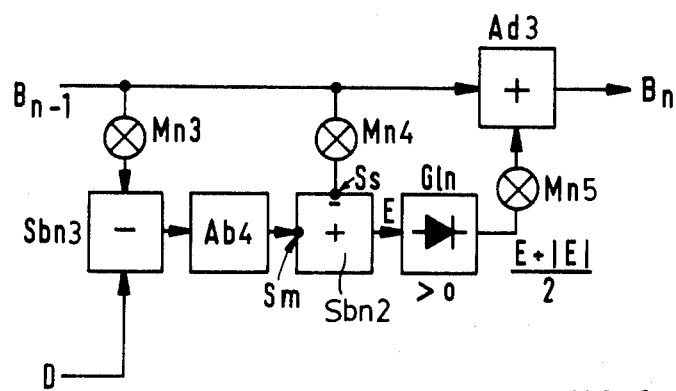
FIG. 2 is an improved version of the circuit of FIG. 1 for further approximation to the value of the complex digital quantity $x+iy$.

For video applications, particularly for demodulation of a quadrature-modulated video signal, an error of less than about 0.5% is desirable. In an improved version of the basic circuit of FIG. 1, at least one correction circuit is added whose block diagram is shown in FIG. 2. The numbering of the multipliers, adders, etc. continues from that of FIG. 1. As the correction circuit of FIG. 2 contains three additional constant multipliers Mn3, Mn4, and Mn5, with three additional multiplication factors m3, m4, and m5, three further degrees of freedom are obtained which permit an optimum choice.

To use the correction circuit of FIG. 2 together with the basic circuit of FIG. 1 for the above purpose, the output of the second adder Ad2 is coupled to the first input of a third adder Ad3, whose second input is connected to the output of the digital rectifier Gln via the fifth constant multiplier Mn5 of the correction circuit. The signal E applied to the input of the digital rectifier Gln is the output signal of the digital subtracter Sbn2, from which the rectifier forms the signal $(E+|E|)/2$ by half-wave rectification, i.e., a signal which is always greater than or equal to zero. The output of the fourth constant multiplier Mn4 is coupled to the subtrahend input Ss of the subtracter Sbn2, which has its minuend input Sm connected to the output of the fourth absolute-value circuit Ab4. The input of the fourth constant multiplier Mn4 and the input of a third constant multiplier Mn3 are connected to the first input of the third adder Ad3. Coupled to the input of the additional absolute-value circuit Ab4 is the output of a third subtracter Sbn3, whose first and second inputs are connected to the output of the third constant multiplier Mn3 and to the second input D of the second constant multiplier M2 of the basic circuit, respectively.

The correction circuit of FIG. 2 may be followed by further correction circuits of the same construction to which the output signal of the preceding correction circuit and the signal at the input D of the second constant multiplier M2 of the basic circuit of FIG. 1 are applied.

Figure 5:
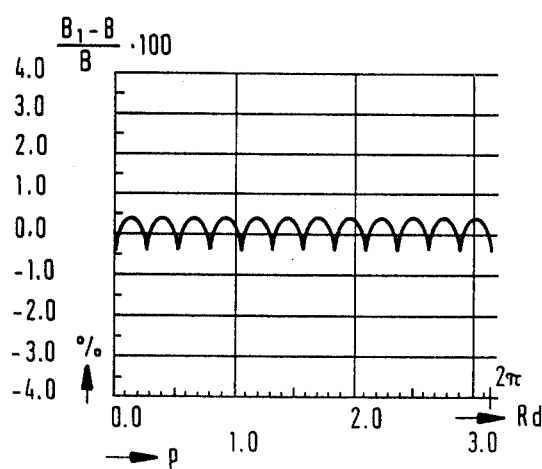
FIG. 5 illustrates the relative error of a first approximation B1 to the signal B applied to the inputs.

If a single correction circuit is used in connection with the basic circuit, the relative error can be reduced considerably. If, according to a preferred embodiment of such a circuit arrangement in accordance with the invention, a first constant multiplier M1 with a multiplication factor of m1=0.6591, a second constant multiplier M2 with a multiplication factor of m2=0.27183, a fifth multiplier Mn5 in the correction circuit with a multiplication factor of m5=0.19918, a fourth constant multiplier Mn4 in the correction circuit with a multiplication factor of m4=0.17157, and a third constant multiplier Mn3 in the correction circuit with a multiplication factor of m3=0.53893 are used, the relative error of a first approximation B1 to the signal B applied to the two inputs will be smaller than 0.43%, as illustrated in FIG. 5. Such a relative error is acceptable for the demodulation of a quadrature-modulated video signal.

If the arrangement is implemented using monolithic integrated circuit techniques, a considerable amount of chip area will be occupied by the constant multipliers.

However, since five multiplication factors can be chosen independent of each other if a single correction circuit is used, it is possible to choose easy-to-implement multiplication factors without the relative error significantly increasing from the optimum values mentioned above. Such suitable values of the multiplication factors are $$m1 = 0.625 = \tfrac{1}{2} + \tfrac{1}{8},$$

$$m2 = 0.25781 = \tfrac{1}{4} + 1/128,$$

$$m3 = 0.5625 = \tfrac{1}{2} + 1/16,$$

$$m4 = 0.1875 = \tfrac{1}{8} + 1/16, \text{ and}$$

$$m5 = 0.1875 = \tfrac{1}{8} + 1/16.$$

With such multiplication factors, the chip area occupied by the constant multipliers is reduced considerably. In a monolithic integrated circuit with 3-micron geometry and a correction circuit for 8-bit parallel transfer over two 20-MHz data buses, the relative error is less then 0.52% and the constant multipliers occupy an area of about 1.5 mm².

What is claimed is:

1. A digital circuit arrangement for calculating the value of a complex digital quantity x+iy of two digital values x and y as an approximation to within 4% of the actual value, comprising:
    a first absolute value circuit receiving a first digital value x;
    a second absolute value circuit receiving a second digital value y;
    a first adder having a first input coupled to the output of said first absolute value circuit and a second input coupled to the output of said second absolute value circuit;
    a first subtracter having a first input coupled to said first absolute value circuit output and a second input coupled to said second absolute value circuit output;
    a third absolute value circuit having its input coupled to the output of said first subtracter;
    a second adder having first and second inputs;
    a first constant multiplier coupling the output of said first adder to said second adder first input; and
    a second constant multiplier coupling the output of said third absolute value circuit to said second adder second input,
    whereby the output of said second adder will provide a zeroth approximation of said value if a predetermined first constant multiplication factor is entered into said first constant multiplier and a predetermined second constant multiplication factor is entered into said second constant multiplier.

2. A digital circuit arrangement in accordance with claim 1, further comprising at least one correction circuit connected in series with said second adder output, said correction circuit comprising:
    a third adder having a first input coupled to said second adder output and having a second input and an output;
    a second subtracter having subtrahend and minuend inputs and an output;
    a third subtracter having a first and second input and an output, said first input being coupled to the output of said third absolute value circuit;
    a third constant multiplier coupling said second adder output to said third subtracter second input;
    a fourth absolute value circuit coupling said third subtracter output to said minuend input of said second subtracter;
    a fourth constant multiplier coupling said second adder output to said subtrahend input of said second subtracter;
    a digital rectifier having an input coupled to said second subtracter output, and having an output; and
    a fifth constant multiplier coupling said second subtracter output to said third adder second input,
    said third adder output providing a first order approximation of said value of said complex digital quantity.

3. A digital circuit arrangement in accordance with claim 2, wherein:
    said first constant multiplier has a multiplication factor of 0.6591;
    said second constant multiplier has a multiplication factor of 0.27183;
    said fifth constant multiplier has a multiplication factor of 0.19918;
    said fourth constant multiplier has a multiplication factor of 0.17157; and
    said third constant multiplier has a multiplication factor of 0.53893.

4. A circuit arrangement in accordance with claim 2, wherein:
said first constant multiplier has a multiplication factor of 0.625;
said second constant multiplier has a multiplication factor of 0.25781;
said fifth constant multiplier has a multiplication factor of 0.1875;
said fourth constant multiplier has a multiplication factor of 0.1875; and
said third constant multiplier has a multiplication factor of 0.5625.

* * * * *